Figure 1:
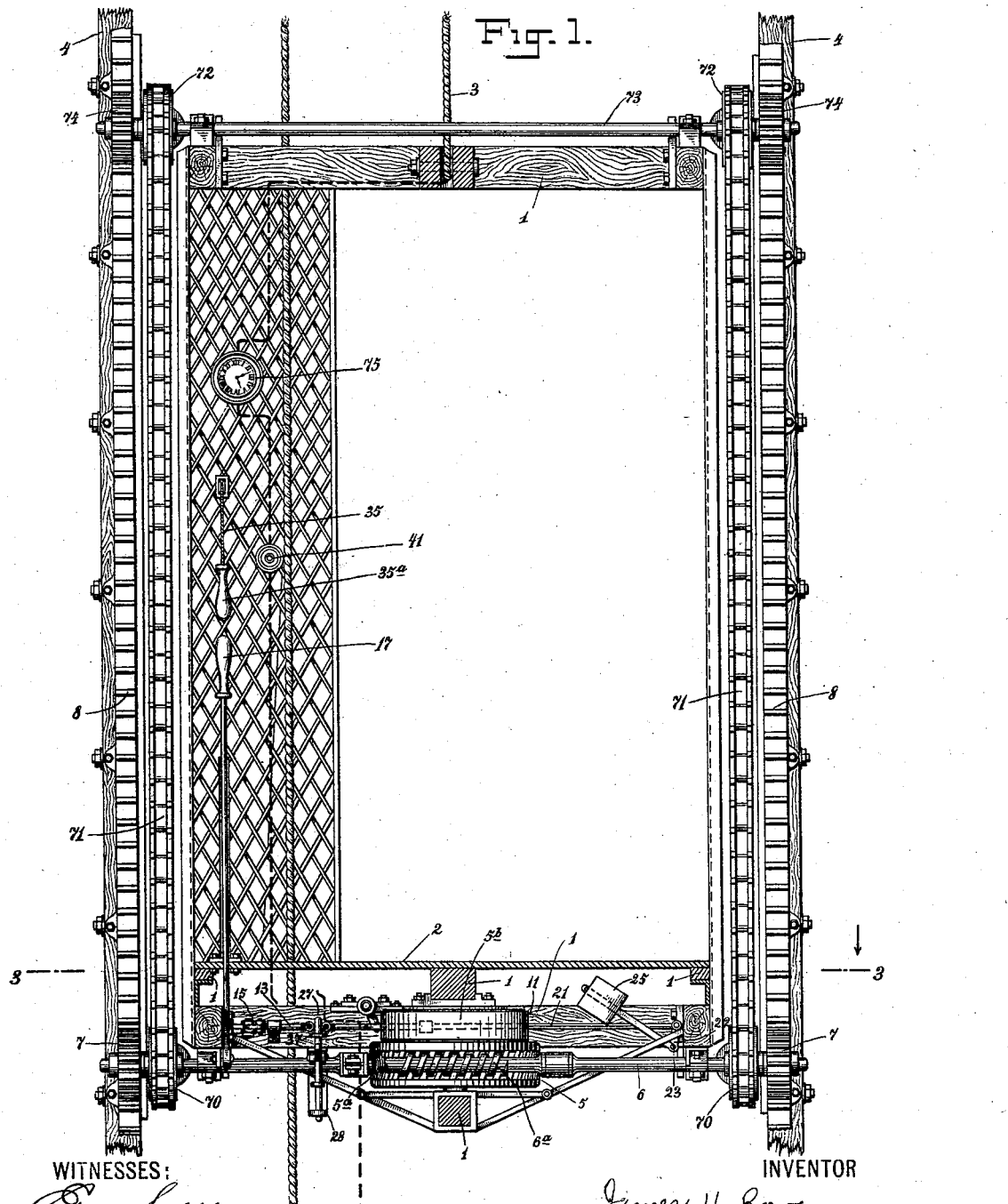

No. 613,942.  
J. H. ROWAN.  
ELEVATOR.  
(Application filed Dec. 11, 1897.)  
Patented Nov. 8, 1898.

(No Model.) 6 Sheets—Sheet 2.

WITNESSES:

INVENTOR  
James H. Rowan  
BY  
Walter & Kenyon  
his ATTORNEYS

No. 613,942. Patented Nov. 8, 1898.
J. H. ROWAN.
ELEVATOR.
(Application filed Dec. 11, 1897.)
(No Model.) 6 Sheets—Sheet 3.

WITNESSES: INVENTOR
James H. Rowan
BY
Wilter & Kenyon
his ATTORNEYS

No. 613,942.  
J. H. ROWAN.  
ELEVATOR.  
(Application filed Dec. 11, 1897.)  
Patented Nov. 8, 1898.
(No Model.)  
6 Sheets—Sheet 4.
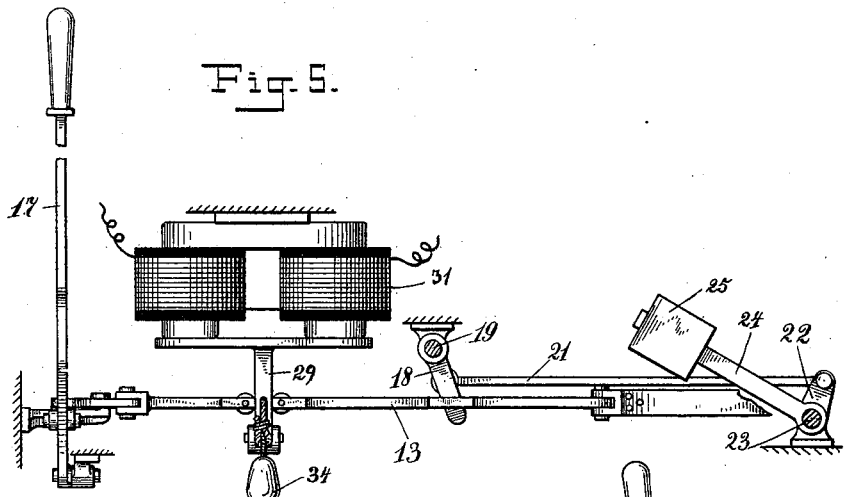
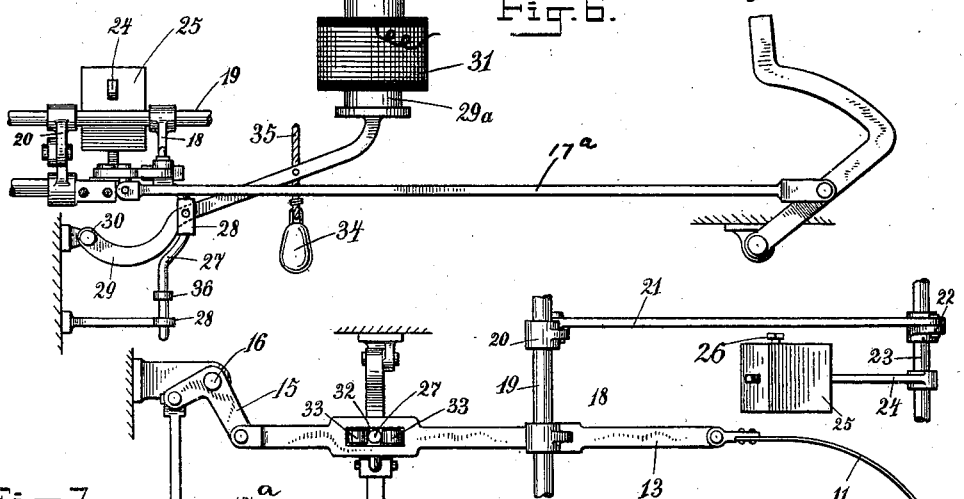
WITNESSES:
INVENTOR  
James H. Rowan  
BY  
Walter & Kenyon  
his ATTORNEYS No. 613,942. Patented Nov. 8, 1898.
J. H. ROWAN.
ELEVATOR.
(Application filed Dec. 11, 1897.)
(No Model.) 6 Sheets—Sheet 5.
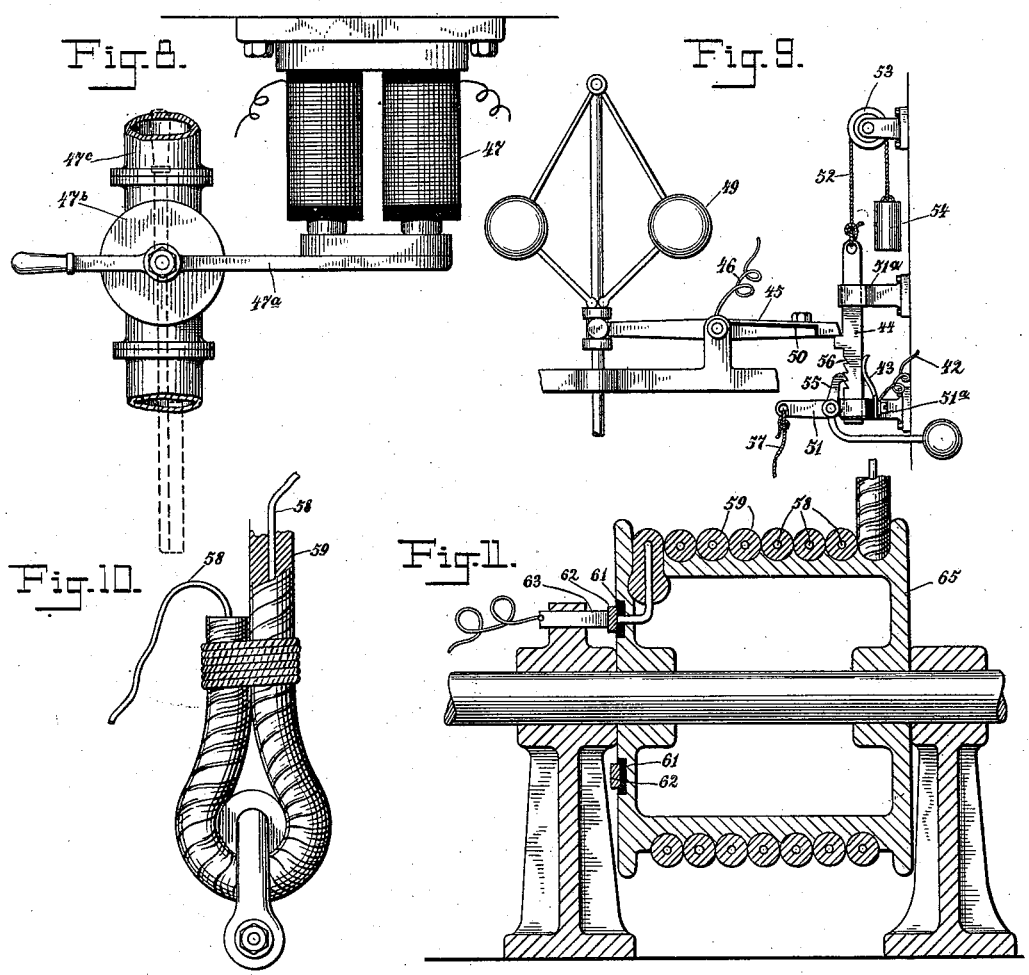
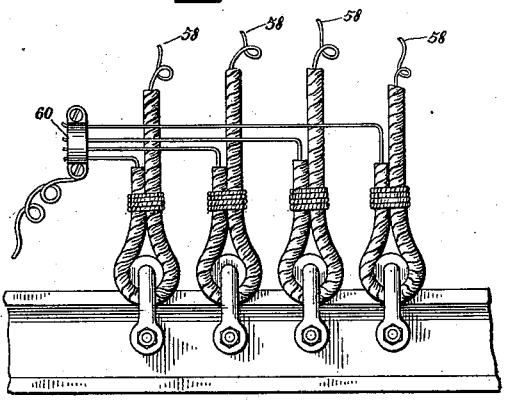
WITNESSES: INVENTOR
James H. Rowan
BY
Walter & Kenyon
his ATTORNEYS

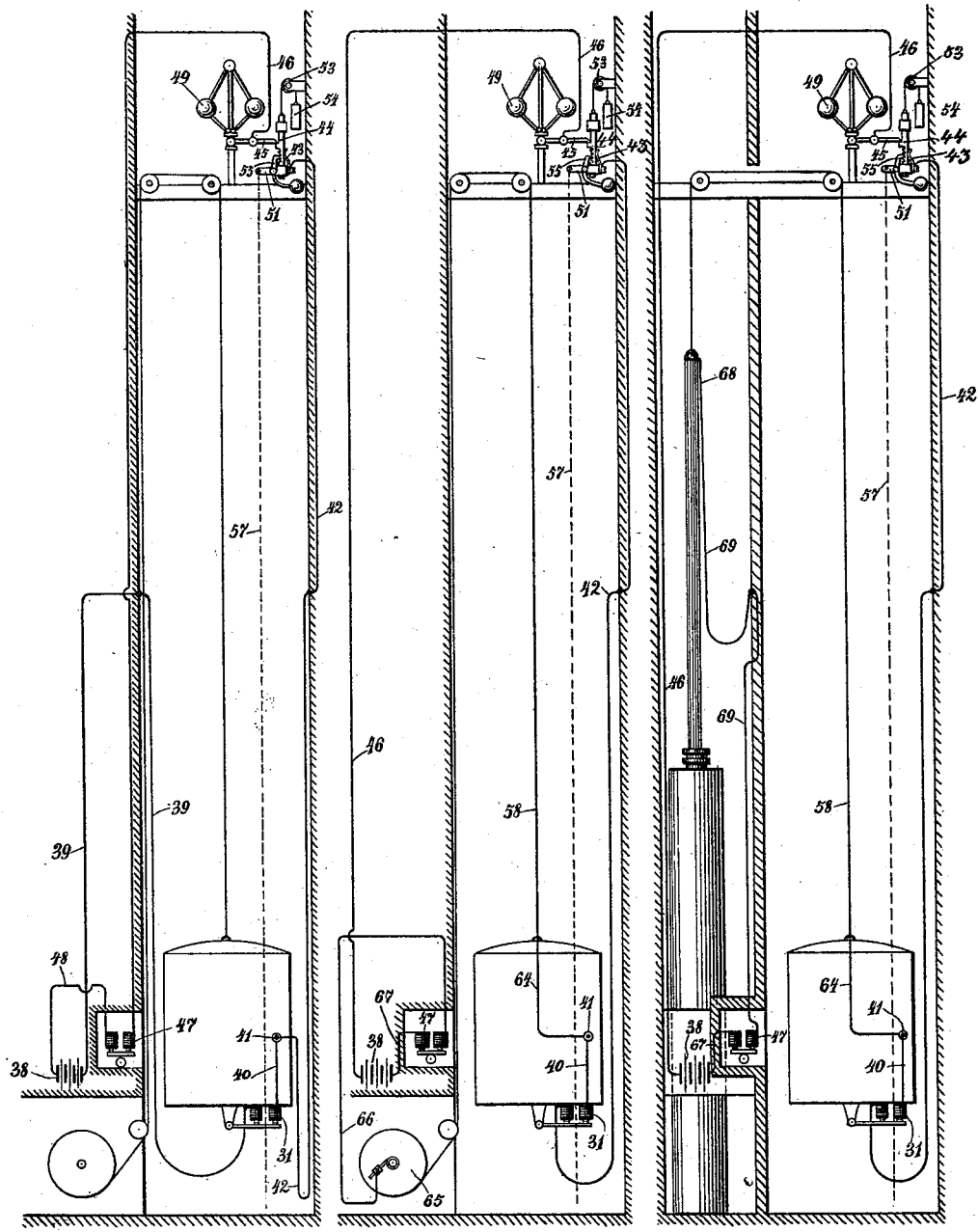

UNITED STATES PATENT OFFICE.

JAMES H. ROWAN, OF NEW YORK, N. Y., ASSIGNOR OF TWO-THIRDS TO ABRAHAM BOEHM AND LEWIS COON, OF SAME PLACE.

ELEVATOR.

SPECIFICATION forming part of Letters Patent No. 613,942, dated November 8, 1898.

Application filed December 11, 1897. Serial No. 661,524. (No model.)

*To all whom it may concern:*

Be it known that I, JAMES H. ROWAN, a subject of the Queen of England, and a resident of the city, county, and State of New York, have invented a certain new and useful Improvement in Elevators, of which the following is a specification.

My invention relates to elevators, and particularly to means for checking or arresting the speed of elevators. Its object is to provide better and more adequate means for stopping or for checking the speed of elevator-cars in case of accident and to provide means for doing this automatically in case the hoisting-cable should break or the speed of the car should for any reason become excessive. It consists in the combinations hereinafter shown and described in the claims at the end of this specification.

In my improved device in its preferred form both the brake and the part against which the brake presses, as here shown the brake-wheel, are on the car and the motion of the car is lessened or stopped by pressure exerted between the brake and the brake-wheel, the latter being connected by suitable mechanism with racks or similar devices on the side of the elevator-shaft. My brake, moreover, is operated by stored power, as shown in the drawings a weight, which under normal conditions is always in operative position, but which is withheld from operation by stop mechanism.

I will now proceed to describe the preferred form of my improved device shown in the drawings, in which like figures in the different views indicate corresponding parts.

Figure 2:
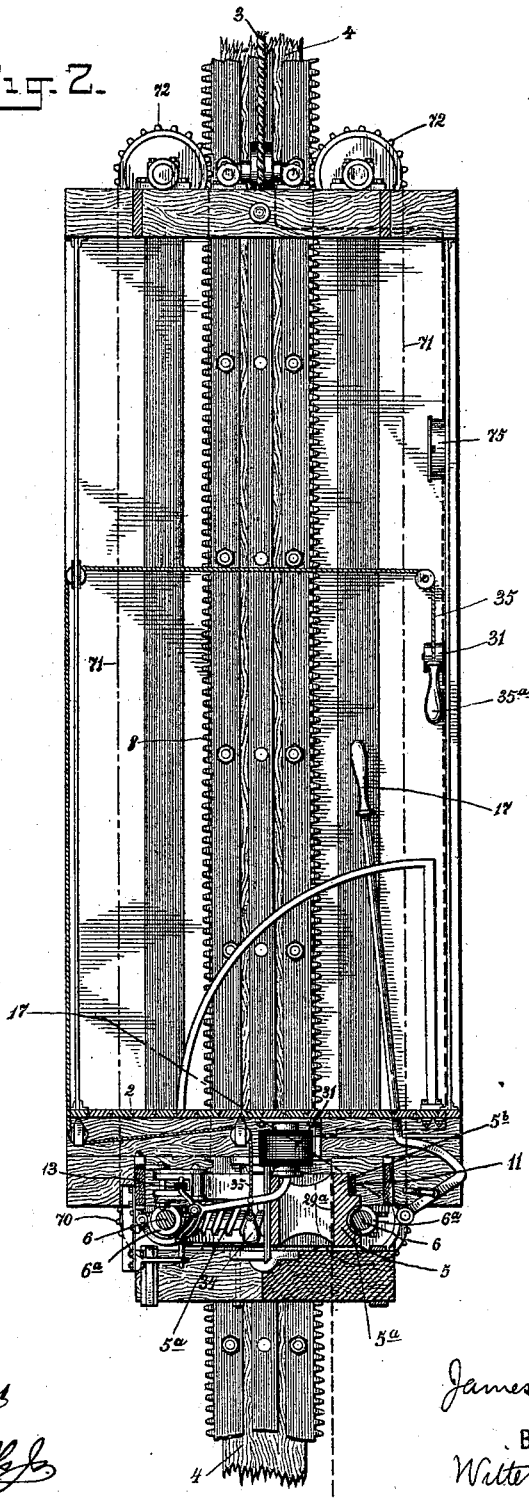
Figure 3:
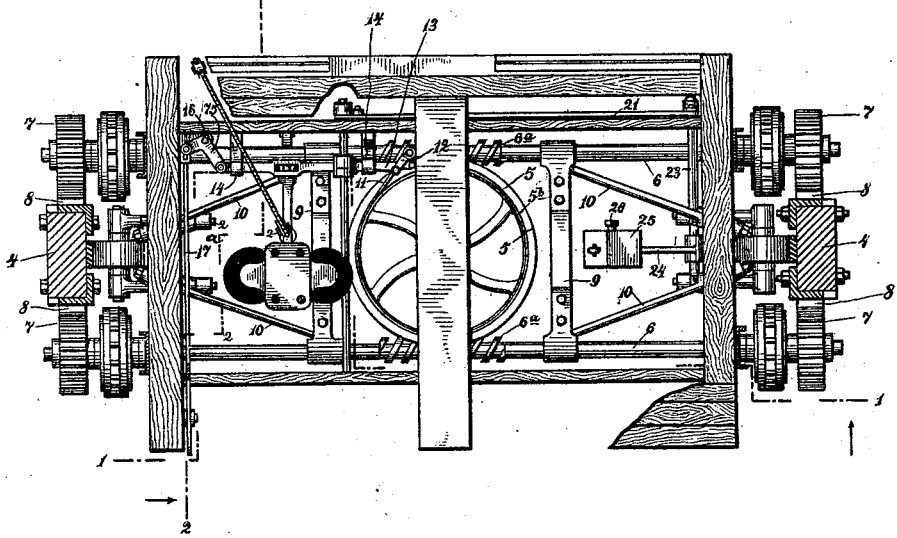
Figure 4:
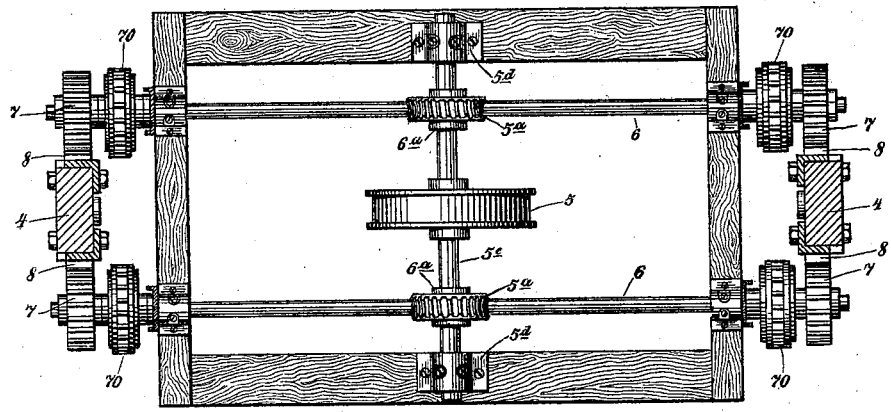

Figure 1 is a vertical longitudinal section of an elevator car and shaft embodying my improved device, taken on the lines 1 1 of Fig. 3, looking in the direction of the arrow. Fig. 2 is a vertical transverse section of the same, taken on the lines 2 2 of Fig. 3, looking in the direction of the arrow. Fig. 3 is a horizontal section, taken on the line 3 3 of Fig. 1, looking in the direction of the arrow. Fig. 4 is a similar view showing a modification of my improved brake-wheel and its connections. Figs. 5, 6, and 7 are detail views showing the movable arm, stop-bar, weight, and their immediate connections. Fig. 8 is a view showing a device for cutting off the supply of steam, electric current, or water. Fig. 9 is a view of the automatic governor. Fig. 10 is a view of my new improved hoisting-cable. Figs. 11 and 12 are views showing the method of making electrical connection with my improved hoisting-cable at the drum and where several cables are employed, respectively. Fig. 13 is a diagrammatic view of my improved electric circuit where the cable is not used as a conducting medium. Fig. 14 is a similar view where my improved conducting hoisting-cable is used, and Fig. 15 is a similar view of the circuit and its connections in an elevator of the plunger type.

1 represents the framework, 2 the flooring, and 3 the hoisting-cable, of the car, and 4 represents the framework of the shaft.

Beneath the flooring of the car is a large brake-wheel 5, mounted horizontally in bearings in the framework of the car and free to rotate in either direction. The worm-wheel $5^a$ is cut upon the lower part of this wheel and meshes with a worm $6^a$ upon shaft 6. The upper part of brake-wheel 5, which I have designated as $5^b$ in the drawings, is somewhat smaller in diameter. The shafts 6 6 are mounted in bearings in the framework of the car, are free to rotate in either direction, and carry upon each of their ends spur-wheels 7, which engage with the teeth of racks 8, secured to the side of the elevator-shaft.

9 9 are transverse strengthening-bars having bearings for the shafts 6. Their object is to prevent the shafts 6 from springing, and they thus tend to keep worms $6^a$ in close contact with worm-wheel $5^a$.

10 10 are braces for sustaining the bearings of the shafts 6.

As the elevator car ascends or descends racks 8, spur-wheels 7, shafts 6, worms $6^a$, and worm-wheel $5^a$ will cause brake-wheel 5 to rotate in one direction as the car ascends and in the other direction as the car descends.

11 is a brake-band secured at one end to the framework of the car by link 12 and passing around the upper portion $5^b$ of brake-wheel 5 and secured at its other end to bar 13. (Shown at Fig. 7.) Bar 13 is mounted in bearings 14 of the framework, and when released, as hereinafter described, is capable of a sliding horizontal motion through its bearings. At its other end it is pivotally secured to a bell-crank 15, pivoted at 16, and bell-crank 15 is pivoted at its other end to link 17ᵃ, pivotally connected to lever 17, which projects up into the car, and is provided with a handle, as shown. The object of this lever, arm, and bell-crank will be presently described.

When the elevator is in its normal condition, bar 13 is in its extreme right-hand position, as appears in Fig. 7, and brake-band 11 is loose upon brake-wheel 5 and does not interfere in any way with the rotation of the brake-wheel, but when bar 13 is pulled to the left, as one looks at it in Fig. 3, brake-band 11 is pulled tightly against portion 5ᵇ of brake-wheel 5 and acts as a brake upon the wheel and through the worm-wheel, the worm-shafts, spur-wheels, and racks acts as a brake on the elevator and retards its progress or brings it to a complete stop.

In the form of my device shown in the drawings brake-band 11 is put into operation by the following-described mechanism. 18 is an arm engaging at its lower end with bar 13 and rigidly mounted at its upper end upon shaft 19. Also fixedly mounted upon the same shaft is another arm 20, which at its lower end engages with rod 21, this rod being pivotally secured at its farther end to arm 22, rigidly secured to shaft 23. Upon the latter shaft is also secured arm 24, which carries weight 25. This weight is adjustable, by means of set-screw 26 upon arm 24, so that it may be placed at any desired position on that arm. In the normal condition weight 25 is raised as shown in Fig. 1 and is held in that position by means of a stop 27 in the manner presently to be described. When stop 27 is removed from its operative position, weight 25 descends, and through arms 24, shaft 23, arm 22, rod 21, arm 20, shaft 19, and arm 18 forces rod 13 to the left as one looks at Fig. 3 or Fig. 7, and thereby causes brake-band 11 to act as a brake upon wheel 5 and to slacken or stop the progress of the car. By adjusting its weight and position upon arm 24 weight 25 can be made to act with any desired amount of power and to retard or stop the motion of the car more or less rapidly.

The stop mechanism for holding the brake in its upward or operative position is as follows: Stop 27, as shown in the drawings, is a short rod capable of vertical motion in bearings 28 of the framework. It is secured to armature-lever 29, pivoted at 30 and operated by electromagnet 31. As armature-lever 29 rises and falls in the manner presently to be described it carries up or down the stop 27. 32 is an opening in bar 13, up through which the upper end of stop 27 is adapted to pass when electromagnet 31 is energized and when bar 13 is in its extreme right-hand position, as shown in Fig. 7. In this position of the mechanism the stop 27 prevents bar 13 from being pulled to the left by weight 25, and thus acts as a stop to hold weight 25 in its uplifted position and to prevent the brake from being put into operation. 33 33 are anti-friction-rollers mounted in opening 32 to reduce the friction as stop 27 passes upward or downward through the opening. 34 is a weight on the end of cord 35, attached at one point to armature-lever 29, so as to cause the armature-lever to drop more rapidly and with greater certainty when the electromagnet is deënergized. Cord 35 runs upward and enters the side of the car, as shown in Fig. 1, and has a handle 35ᵃ at its end. 36 and 37 are projections upon stop 27 to prevent excessive motion downward or upward of the stop.

In normal conditions the electromagnet 31 is energized. Armature-lever 29 is held in its upward position, and stop 27 rests in opening 32 in bar 13, thus holding the braking mechanism out of operative position. The braking mechanism is put into action either by the operator or automatically, as will be presently described, through the breaking of the circuit of the electromagnet 31 and the consequent deënergizing of that magnet. When the armature-lever 29 through its own weight and the weight 34 drops, it at once removes stop 27 from opening 32 and permits weight 25, through the intermediate mechanism, to carry bar 13 to the left and bring brake-band 11 into operation. This removal of stop 27 from contact with bar 13 may be accomplished in a number of different ways and either intentionally by the operator or automatically in case of accident, as will be now described.

The circuit through electromagnet 31 may be arranged in any one of several different ways. Three different methods are shown in Figs. 13, 14, and 15, respectively. The circuit shown in Fig. 13 is one adapted for an elevator with the ordinary hoisting-cables and will be now described. This circuit is as follows: battery 38, wire 39 to a point about midway of the height of the elevator-shaft, thence as a pendent flexible cord to electromagnet 31 under the flooring of the car, thence by wire 40 to push-button 41 and wire 42 as a pendent flexible cord to about the middle of the height of the elevator-shaft, and thence to spring 43, which bears against vertical sliding bar 44, thence to the right-hand portion of lever 45, which is insulated from the other parts of the lever, wire 46 to electromagnet 47, the object of which will be presently described, wire 48 back to battery.

When the operator in the car desires for any reason to put the brake into operation, he presses push-button 41, which is constructed in the ordinary manner, so as to break the circuit at that point, whereupon brake-band 11 is put into operation, as above described.

When the speed of the car becomes excessive, the brake is automatically put into operation by the following-described mechanism: 49 represents a governor of any ordinary construction. It carries in its upward and downward movements the left end of lever 45, as shown in Fig. 9. The right end of lever 45 has a portion of its surface separated by insulation 50 from the remaining parts of the lever. In the normal condition the right end of lever 45 rests upon a ledge forming part of the sliding bar 44. This bar is adapted to slide vertically in openings in brackets 51ª. At its upper end it is secured to cord 52, which passes over pulley 53 and has a weight 54 at its other end. The weighted pawl 55 engages with rack-teeth 56 toward the lower end of sliding bar 44 and tends to hold the bar down. Spring 43 tends to make a more perfect electrical contact between wire 42 and bar 44. Pawl 55 when engaged with teeth 56 prevents upward movement, and weight 54 tends to raise the bar when released from engagement with the pawl. If the speed of the elevator exceeds that for which the governor is adjusted, the balls fly outward, lever 45 is raised at its left end and depressed at its right end until it slips off from the ledge of sliding bar 44, breaking the circuit at that point, whereupon the brake is at once set, as above described, and at the same time weighted pawl 55 holds bar 44 in its downward position. The moment the speed of the car falls below the point for which the governor is set lever 45 will return to its normal position; but as the ledge of sliding arm 44 is now below the normal position of lever 45 the electrical connection between the lever and arm still remains broken. The connection between these parts is restored by pulling down rope 57 at the end of the lever 51, on which pawl 55 is mounted, which withdraws pawl 55 from contact with bar 44, whereupon weight 54 at once pulls bar 44 up to its original position and restores contact between lever 45 and the ledge of bar 44 and closes the circuit at that point. Rope 57 may run to any convenient place where it can be easily reached.

My improved device for putting the brake into operation in case of the breaking of the cable consists of the following-described apparatus: To cause the braking device to be operated when a hoisting-cable of the elevator-car is broken, I cause the circuit to pass through the elevator-hoisting cable or cables. For this purpose I use a hoisting-cable the core or center of which consists of a copper or other conducting-wire covered with insulating material, with the steel strands of the cable surrounding the core. The cable is secured at its end to the car and to the elevator-shaft in the ordinary manner, as shown in Fig. 10, and the insulated copper wire 58 passes out from the end, as shown in Fig. 10. This figure shows insulated wire surrounded by the steel strands 59 of the cable. Where more than one cable is employed, I preferably use the same conducting-cable, as shown in Fig. 12, bringing the wires out of the ends to a common metallic connecting-post 60. With this common metallic post one wire only need be connected, as shown in Fig. 12.

Fig. 11 shows means for connecting the circuit-wire with the cable as wound upon an ordinary drum. The insulated copper wire passes out from the end of the cable wound on the drum and passes through an insulating-plate 61 on the face of the drum to a circular metallic ring 62 on the face of the drum. This metallic ring at all times in its revolution presses against metallic spring 63, with the end of which the circuit-wire is connected, as shown. When the hoisting cable or cables are broken, the circuit, through electromagnet 31, is at once broken, and the braking mechanism is automatically put into operation.

Figs. 14 and 15 illustrate two methods of arranging the circuit through electromagnet 31, where the circuit runs through the hoisting-cable, Fig. 14 illustrating it as used in the ordinary elevator system and Fig. 15 illustrating it as used in connection with a hydraulic-plunger system. In Fig. 14 the circuit is as follows: battery 38, wire 46, lever 45, sliding arm 44, spring 43, wire 42, electromagnet 31, wire 40, push-button 41, wire 64 to hoisting-cable at the top of the car, wire 58 inside of the cable-drum 65, wire 66, electromagnet 47, wire 67 to battery. In Fig. 15 the circuit is as follows: battery 38, wire 46, lever 45, sliding arm 44, spring 43, wire 42, electromagnet 31, wire 40, push-button 41, wire 64 to the hoisting-cable at the top of the car, wire 58 inside of the cable to the top of the plunger 68, pendent flexible wire 69 to a point about midway of the elevator-shaft, thence to electromagnet 47, thence by wire 67 back to battery.

In order to provide means to automatically shut off the supply of steam, electricity, or the supply of water in case of hydraulic elevators at the same time that the braking mechanism is to be applied, I have devised the mechanism shown in Fig. 8 of the drawings. 47 is an electromagnet which is arranged in the same circuit as electromagnet 31. (Shown in Figs. 13, 14, and 15.) 47ª is its armature-lever. 47ᵇ represents a valve operated by armature-lever 47ª of any known construction for the purpose of shutting off the supply of electricity, steam, or water in the pipe 47ᶜ from the engine or elevator. By these means whenever the operator intentionally puts the braking mechanism into operation or whenever through an accident that mechanism is automatically put into operation the power will at the same time and by the same act be also shut off.

After stop 27 has been withdrawn from bar 13 by the operator or automatically the brake will remain set until released in the following manner: If the braking mechanism has been put into operation by means of the governor, cord 57 is first pulled downward, so as to close the circuit between lever 45 and sliding arm 44. Lever 17 in its normal condition is nearly vertical, as shown in Figs. 2 and 6; but when the braking mechanism has been put into operation rod 13, through bell-crank 15, pulls lever 17 down into the position shown by the dash-and-dot line in Fig. 2. When the operator desires to release the braking mechanism, he raises handle 17 into its upright position. This throws bar 13 toward the right to the position it occupies in Fig. 7, with the opening 32 immediately above the end of stop 27. The operator then pulls down handle 35$^a$, which, through cord 35, pulls armature-lever 29 upward, so that armature 29$^a$ is brought within the magnetic influence of electromagnet 31, which, now being energized, immediately attracts and holds the armature in the position shown in Fig. 6. The rising of armature-lever 29 forces stop 27 into opening 32 between antifriction-wheels 33, where it at once acts as a stop to the braking mechanism. When the operator throws lever 17 into its raised position, weight 25 is also lifted into its raised position, as shown in Fig. 1.

Fig. 4 shows a modified form of the brake-wheel. In this construction brake-wheel 5 is mounted on a horizontal shaft 5$^c$, rotating freely in bearings 5$^d$ in the framework of the car, and having worm-wheels 5$^a$, meshing with worms 6$^a$ on shafts 6. Shafts 6 carry spur-wheels 7 on their ends, meshing with racks 8, secured to the framework 4 of the elevator-shaft. In all other respects the mechanism is substantially the same as heretofore described in connection with the horizontal brake-wheel 5.

To insure more even running of the elevator and to provide against breakage of the teeth of spur-wheels 7 or rack 8, and also to give additional strength, I preferably mount upon shaft 6, near each end, sprocket-wheels 70, over which run chains 71, which at their upper end pass over and engage with the teeth of sprocket-wheels 72, mounted upon shafts 73. These shafts 73 carry at each of their ends spur-wheels 74, meshing with rack 8. Motion is communicated from these spur-wheels 74, shafts 73, through sprocket-wheels 72, chains 71, and sprocket-wheels 70 to shaft 6.

The operator can at any time test the braking mechanism to see if it is in operative condition by pressing push-button 41. Lever 17 will move downward, and handle 35$^a$ of rope 35 will rise if the braking parts are operative. It is advantageous to have the operator do this at least once a day—as, for instance, in the morning—and as a check upon him a recording-clock 75, arranged like a watchman's clock and having similar recording mechanism, can be placed in the circuit of magnet 31, so that upon the breaking of the circuit a permanent record of the time of such break will be made within the clock.

When the brake has been set in any manner, the operator in the car can by pressing lever 17 one way or the other increase or decrease the pressure of the brake-band against the brake-wheel.

By the terms "normal condition" or "normal operation," as used by me in this specification, I mean the condition or operation of the parts when the elevator is running in its ordinary manner, or, in other words, when the stop is in operative position preventing the brake-band from being set, and the other parts are in their corresponding positions, as hereinbefore described.

Many changes and modifications may be made in the different parts of my apparatus without departing from the broad spirit of my invention. Thus in place of weight 25 other devices could be used to accomplish the same purpose, such as springs and the like. The form of the stop-rod could be changed as well as its manner of engagement with the movable bar. Thus the stop-rod instead of passing through a hole in the movable bar could make engagement with it in other ways so as to prevent the bar from setting the brake. In place of the gear-wheels and the racks wheels without teeth and guides without teeth might be used, although not as effectively as the gear-wheels and racks shown and described herein. The brake-wheel could be mounted vertically, as shown in Fig. 4, and other changes could be made in its form or construction without departing from the spirit of my invention. The form of lever 17 could be similarly modified. In the drawings it is shown as slightly tipped forward in its upward position. This form I prefer, as the weight of the lever assists weight 25 in putting the movable rod into motion. In order to avoid an unnecessary amount of noise, due to the numerous gear-wheels employed, I prefer to make the teeth of the gear-wheels that come into contact with the rack of well-seasoned white oak set with the grain of the wood running toward the face of the teeth, the teeth being mounted in suitable pockets in the gear-wheels. A gear-wheel having such teeth runs with little noise and is very durable.

My improved device for stopping elevators is simple in construction and efficient in action. The power for setting the brakes is always in operative condition and is thrown into operation by the mere withdrawal of a stop, an act requiring but little power and which can be done by automatic means whenever an accident occurs or the speed of the car becomes excessive with ease and great certainty. The action of the brake, while rapid enough for all practical purposes, does not cause an immediate stoppage of the elevator or such a sudden stoppage as would tend to break the racks, gear-wheels, or other parts of the mechanism. The stoppage is gradual, although rapid. My improved device has also the advantage that it will operate to stop the car when moving upward at an excessive speed as well as when the car is falling. This is a matter of great importance in some forms of elevators—such, for instance, as the plunger type.

What I claim as new, and desire to secure by Letters Patent, is—

1. The combination in an elevator, of a brake-wheel mounted on the car, racks secured to the elevator-shaft, gear-wheels mounted upon shafts and meshing with the racks, worms upon said shafts engaging with a worm-wheel connected with the brake-wheel, whereby the brake-wheel will revolve as the car moves, a brake-band adapted to act against the brake-wheel, a movable bar secured to an end of the brake-band and adapted, when moved in one direction, to set the brake-band and, when moved in the other direction, to release it, a weight connected with said movable bar and adapted to move the bar so as to set the brake, a stop controlled by an electromagnet and adapted, when the latter is energized, to engage with the movable bar to prevent the setting of the brake, a circuit through the electromagnet normally closed and means for breaking the circuit, whereby the motion of the car may be lessened or arrested, substantially as set forth.

2. The combination in an elevator, of a brake-wheel mounted on the car, racks secured to the elevator-shaft, gear-wheels mounted upon shafts and meshing with the racks, worms upon said shafts engaging with a worm-wheel connected with the brake-wheel, whereby the brake-wheel will revolve as the car moves, a brake-band adapted to act against the brake-wheel, a movable bar secured to an end of the brake-band and adapted, when moved in one direction, to set the brake-band and, when moved in the other direction, to release it, a weight connected with said movable bar and adapted to move the bar so as to set the brake, an electromagnet and its armature-lever, a stop secured to and moving with the armature-lever and adapted, when in one position, to engage with the movable bar to prevent the setting of the brake, a circuit through the electromagnet, normally closed and adapted, when in that condition, to hold the stop in operative position against the movable bar, circuit-breakers in said circuit adapted to be operated automatically, in case of accident or excessive speed of the elevator-car, or intentionally by the elevator-man, whereby the brake will be set, substantially as set forth.

3. The combination in an elevator, of a brake-wheel mounted on the car, racks secured to the elevator-shaft, gear-wheels connected with the brake-wheel and meshing with said racks, whereby the brake-wheel will revolve as the car moves, a brake-band adapted to act against the brake-wheel, a movable bar secured to an end of the brake-band and adapted, when moved in one direction, to set the brake-band and, when moved in the other direction, to release it, a weight connected with said movable bar and adapted to move the rod so as to set the brake, an electromagnet, a stop controlled by the electromagnet and adapted, when the latter is energized, to engage with the movable bar to prevent the setting of the brake, a circuit through the electromagnet normally closed, means for breaking the circuit whereby the motion of the car may be lessened or arrested, a lever in the car and connecting mechanism between it and the movable bar for moving the latter back to its normal position and for raising the weight, a handle in the car and a device connecting it with the armature-lever, whereby the armature may be brought against the electromagnet and the stop be returned to its normal position in engagement with the movable bar, substantially as set forth.

4. The combination in an elevator with a brake and a stop for preventing the setting of the brake, of an electromagnet for controlling the stop, an electric circuit through said magnet, a circuit-breaker therein, and a governor adapted to operate automatically to break the circuit when the speed of the car becomes excessive, whereby the brake will be automatically controlled, substantially as set forth.

5. The combination in an elevator with a brake and a stop for preventing the setting of the brake, of an electromagnet adapted, when energized, to hold the stop in operative position and thereby prevent the setting of the brake, an electric circuit, normally closed, through said magnet, a circuit-breaker therein, and a governor adapted to operate automatically to break the circuit when the speed of the car becomes excessive whereby the brake will be automatically set, substantially as set forth.

6. The combination in an elevator with a brake and a stop for preventing the setting of the brake, of an electromagnet adapted, when energized, to hold the stop in operative position and thereby prevent the setting of the brake, an electric circuit, normally closed, through said magnet, a circuit-breaker therein, and a governor adapted to operate automatically to break the circuit when the speed of the car becomes excessive whereby the brake will be automatically set, substantially as set forth.

7. The combination in an elevator with a brake and a stop for preventing the setting of the brake, of an electromagnet adapted, when energized, to hold the stop in operative position and thereby prevent the setting of the brake, an electric circuit, normally closed, through said magnet passing through the hoisting-cable of the car, a circuit-breaker in the said circuit, a governor adapted to operate automatically to break the circuit when the speed of the car becomes excessive whereby the breaking of the hoisting-cable or excessive speed of the car will break said circuit and automatically set the brake, substantially as set forth.

8. The combination in an elevator with a brake and a stop for preventing the setting of the brake, of an electromagnet adapted, when energized, to hold the stop in operative position and thereby prevent the setting of the brake, an electric circuit, normally closed, through said magnet, a circuit-breaker in said circuit, and a governor controlling said circuit-breaker, whereby the circuit will be broken and the brake be set whenever the speed of the car becomes excessive, substantially as set forth.

9. The combination in an elevator of a brake-wheel mounted on the car, means connected with said wheel and with the elevator-shaft adapted to cause the brake-wheel to revolve as the car moves, a brake adapted to act against the brake-wheel, means for setting the brake, a stop for arresting the operation of said means, an electromagnet, normally energized, for holding the stop in operative position, a circuit through said magnet, normally closed, said circuit passing through the hoisting-cable of the car, whereby the breaking of the cable will break the circuit and set the brake, substantially as set forth.

10. The combination in an elevator of a brake-wheel mounted on the car, means connected with said wheel and with the elevator-shaft adapted to cause the brake-wheel to revolve as the car moves, a brake adapted to act against the brake-wheel, means for setting the brake, a stop for arresting the operation of said means, an electromagnet, normally energized, for holding the stop in operative position, a circuit through said magnet, normally closed, a circuit-breaker in said circuit and a governor controlling said circuit-breaker, whereby the circuit will be automatically broken and the brake be set whenever the speed of the car becomes excessive, substantially as set forth.

11. The combination, in an elevator system, with a hoisting-cable having a core consisting of an insulated electric conductor surrounded by the strands of the cable, and a drum, of a circular insulated metallic plate in the face of the drum and electrical connection with the conductor of the hoisting-cable, a metallic wheel or brush adapted to bear against the said plate whereby the circuit between the conductor of the cable and the wheel or brush, may always be kept closed, substantially as set forth.

12. The combination in an elevator, of a brake adapted to stop or check the motion of the car, means operated by stored power for setting the brake, a stop for arresting the operation of said means, an electromagnet controlling the stop, a circuit through the electromagnet normally closed and adapted in that position to hold the stop in operative position, means for breaking the said circuit to release the stop and set the brake, and means for closing the circuit and for returning the stop to its operative position, substantially as set forth.

13. The combination in an elevator, of a brake-wheel mounted on the car, means connected with the said wheel and with the elevator-shaft adapted to cause the brake-wheel to revolve as the car moves, a brake adapted to act against the brake-wheel, means operated by stored power for setting the brake, a stop for arresting the operation of said means, and an electromagnet controlling the stop, means for making or breaking the circuit through said electromagnet whereby the brake may be set, a lever connected with said brake and stop whereby the pressure of the brake upon the brake-wheel may be increased or diminished and whereby the stop may be returned to its normal position, substantially as set forth.

14. The combination in an elevator, of a brake adapted to stop or check the motion of the car, means operated by stored power for setting the brake, a stop for preventing the operation of said means, an electromagnet adapted, when energized, to hold the stop in operative position and thereby prevent the setting of the brake, an electric circuit normally closed through said magnet, a circuit-breaker in said circuit and a governor controlling said circuit-breaker whereby the circuit will be broken and the brake be set whenever the speed of the car becomes excessive, substantially as set forth.

15. The combination in an elevator with a brake and a stop for preventing the setting of the brake, of an electromagnet adapted when energized to hold the stop in operative position and thereby to prevent the setting of the brake, an electric circuit normally closed through said magnet, another electromagnet in said circuit controlling the motive power operating the machinery for moving the car whereby upon the breaking of the circuit and the setting of the brake, the said motive power will be shut off, substantially as set forth.

16. The combination in an elevator with a brake and means for setting the brake, of an electromagnet controlling the said means, a circuit through said magnet, another electromagnet in the same circuit controlling the motive power for operating the machinery for moving the car, and means for breaking the said circuit whereby the breaking of the circuit will set the brake and will shut off the said motive power for operating the machinery, substantially as set forth.

17. The combination in an elevator with a brake and a stop for preventing the setting of the brake, of an electromagnet for controlling the stop, an electric circuit through the said magnet, a recording-clock in said circuit adapted when the circuit is broken to make a record of the time of said break, and means for breaking and making said circuit, whereby, when the circuit is broken and the brake is set, a record of the time thereof will be made, substantially as set forth.

18. The combination, in an elevator, of a brake-wheel mounted on the car, racks secured to the elevator-shaft, gear-wheels connected with the brake-wheel and meshing with said racks, whereby the brake-wheel will revolve as the car moves, a brake-band adapted to act against the brake-wheel, a movable bar secured to an end of the brake-band and adapted when moved in one direction, to set the brake-band, and when moved in the other direction, release it, a weight connected with said movable bar and adapted to move the bar so as to set the brake, a stop controlled by an electromagnet and adapted, when the latter is energized, to engage with the movable bar to prevent the setting of the brake, a circuit through the electromagnet normally closed, means for breaking the circuit whereby the motion of the car may be lessened or arrested, a lever in the car and connecting mechanism between it and the movable bar for moving the latter back to its normal position and for raising the weight, and means for returning the armature-lever and stop to their normal positions, whereby the stop will engage with the movable bar and prevent it from setting the brake, substantially as set forth.

In testimony whereof I have signed my name to this specification in the presence of two subscribing witnesses.

JAMES H. ROWAN.

Witness:
EDWIN SEGER,
JOHN O. SEMPLER.